US005832729A

United States Patent [19]

Reid et al.

[11] Patent Number: 5,832,729

[45] **Date of Patent: *Nov. 10, 1998**

[54] HYDRAULIC CONTROL SYSTEM

[75] Inventors: Brian John Reid, Southampton, England; Isidoro Livraghi, Cassano D'adda, Italy

[73] Assignee: Trinova Limited, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 571,270

[22] Filed: Dec. 12, 1995

[30] Foreign Application Priority Data

Dec. 14, 1994 [GB] United Kingdom .................... 9425273

[51] Int. Cl.[6] ...................................................... F16D 31/02

[52] U.S. Cl. ................................. 60/421; 60/422; 60/429

[58] Field of Search .............................. 60/421, 422, 429, 60/430

[56] References Cited

U.S. PATENT DOCUMENTS 3,922,855 12/1975 Birdwell et al. .......................... 60/421

5,052,179 10/1991 Fujii .......................................... 60/421

*Primary Examiner*—F. Daniel Lopez

*Attorney, Agent, or Firm*—Barnes, Kisselle, Raisch, Choate, Whittemore & Hulbert

[57] ABSTRACT

A fluid power control system for use in a mini-excavator, in which a first control section (S2) includes first and second control valves respectively connectable to first (2) and second (4) implement functions; and in tandem with one another. A first gear pump (P2) supplies the actuator connected principally to the first implement (2), and a second gear pump (P3) supplies working fluid to the interconnection between the first and second control valves. The advantage of this arrangement is that, as the first control valve switches from its neutral position to a position selecting its associated implement (2), progressively more of the fluid passing through the second control valve is supplied by the second pump (P3) until, when the implement (2) to which the first control valve is principally connected is fully selected, the two implements (2, 4) are supplied separately by the respective gear pumps (P2, P3).

17 Claims, 4 Drawing Sheets

HYDRAULIC CONTROL SYSTEM

BACKGROUND OF THE INVENTION

This invention relates to hydraulic control systems for use with apparatus capable of operating several functions simultaneously.

The invention has particular, but not exclusive, application to mobile machines, such as earth moving machines, in connection with which it will, in the main, be discussed for convenience.

DESCRIPTION OF PRIOR ART

Typically, earth moving machines, such as excavators, are equipped with three fixed displacement gear pumps and have function movements provided by linear and/or rotary hydraulic actuators. The invention will now be discussed in relation to a mini excavator, Mini excavators are normally provided with a hydraulic control circuit or system comprising three fixed-displacement gear pullups driven by a prime mover, and one or two hydraulic control valve blocks which admit respective pump flows at three distinct points in the control circuit. However, such control arrangements suffer from the disadvantage of achieving poor control of the machine functions, particularly:

1. Lack of simultaneous operation of movement without interaction.

2. Low operational speed.

3. Unbalanced track flows.

Modified control circuits are known which address different aspects of this overall disadvantage but even if such modifications were to be brought together, they would not result in a control circuit or system which would achieve simultaneous operation of a plurality of functions without interaction or which would increase significantly the operational speed to reduce the overall machine cycle time.

It is an object of the present invention to provide a control system which does allow simultaneous operation of a plurality of functions with an increase in operational speed.

BRIEF DESCRIPTION OF THE INVENTION

According to a first aspect of the invention, there is provided a fluid power control apparatus comprising:

a first control section including first and second control valves connectable in tandem; and first and second sources of working fluid under pressure, the first source being operatively connectable to the higher priority control valve of the pair and the second source being operatively connectable to the interconnection between the valves, whereby on switching of the first valve from a neutral position the relationship between the said valves progressively alters from a tandem relationship to one in which the said valves are supplied separately by the respective sources.

Preferably the first control section includes a third control valve operatively connectable in tandem with the second control valve, the second source being operatively connectable to the interconnection between the second and third control valves.

In preferred embodiments, there is provided a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, whereby on switching of the fourth valve from a neutral position the relationship between the fourth and fifth valves progressively alters from a tandem relationship to one in which the fourth and fifth valves are supplied separately by the third and second sources respectively. In particularly preferred embodiments, there is provided a sixth control valve connectable in tandem with the fifth control valve and/or in tandem with the third control valve, one port of the sixth control valve optionally being operatively connectable to a single acting actuator, and a further port thereof being operatively connectable to provide a boost fluid supply to a further actuator supplied by one or more of the other control valves.

Conveniently there is provided a further interconnection, between the third and fifth control valves, the second source being operatively connectable to the said interconnection whereby to supply working fluid to said third and fifth control valves. Preferably the interconnection between the second source and the third and fifth control valves is pressure compensated, whereby to bias flow towards that of the third and fifth valves operating at lower pressure than the other.

The apparatus may optionally include a third control section including at least one control valve, operatively connected in the path between the second source and the first source. The third control section may optionally include two control valves operatively connected in parallel.

The invention is also considered to reside in a control valve connected to a double acting actuator in a regenerative manner, wherein the reduced-area side of the actuator piston is connectable to tank during movement of the actuator in one direction, whereby to permit application of the pressure in the control valve over substantially the entire working surface area of one side of the actuator piston during movement of the actuator in the said direction. Optionally, the control valve may include a bleed orifice for selectively connecting the reduced-area side of the said piston to tank. The above mentioned features may preferably be incorporated in a control apparatus as defined hereinabove.

According to a third aspect of the invention, there is provided a vehicle including a control apparatus and/or a control valve as defined hereinabove. Conveniently the vehicle is configured as a mini-excavator.

According to a further aspect of the invention, there is provided a method of controlling a plurality of double acting actuators comprising:

(i) supplying working fluid under pressure from a first source to a first control section of a fluid power control circuit, the first control section including first and second control valves operatively connectable respectively to the first and second actuators and in a tandem relationship with one another so that the first control valve tends to have priority of supply from the first source;

(ii) supplying working fluid under pressure from a second source to the interconnection between the first and second control valves; whereby on switching of the first valve from a neutral position the relationship between the said valves progressively alters from a tandem relationship to one in which the said valves are supplied separately by the respective sources. The method may optionally include one or more of the following steps.

(iii) supplying working fluid under pressure from the second source to an interconnection between the second control valve and a third control valve operatively connected in tandem therewith;

(iv) supplying working fluid under pressure from a third source to a second control section of a fluid power circuit, the second control section including fourth and fifth control valves operatively connectable to fourth and fifth actuators respectively and in a tandem relationship with one another so that the fourth control valve tends to have priority of supply from the third source;

(v) supplying working fluid under pressure from the second source to the interconnection between the fourth and fifth control valves, whereby on switching of the first valve from a neutral position the relationship between the fourth and fifth valves progressively alters from a tandem relationship to one in which the fourth and fifth valves are supplied separately by the third and second sources respectively;

(vi) supplying working fluid under pressure from the second source to an interconnection between the fifth control valve and a sixth control valve operatively connected in tandem therewith;

(vii) supplying working fluid under pressure from one port of the sixth control valve to a single acting actuator; and (viii) supplying working fluid under pressure from another port of the sixth control valve as boost fluid to a further actuator supplied by one or more of the other control valves.

The invention is also considered to reside in a method of controlling a double acting actuator operatively connected in a regenerative relationship with a control valve and a source of working fluid under pressure, comprising the steps of:

a) selectively connecting the reduced-area side of the actuator piston to tank during movement of the actuator in one direction; and b) selectively supplying working fluid under pressure over substantially the entire working surface area of one side of the piston to cause movement of the actuator in the said direction.

Embodiments of the present invention thus include a hydraulic control system for a machine having a plurality of functions, the system comprising at least two independent control sections, each having an inlet followed by one or more control functions, and an outlet connectable to tank.

Preferably, the independent control sections are grouped together to combine inlets and/or outlets without disturbing the characteristic of independence.

Tandem circuits may be employed in one or more of the control sections to provide a priority of pump flow to the first function of the or each section.

The control sections may be interconnected. For example in an earth moving machine, there may be a connection between the section controlling the blade (dozer) and swing, and the section controlling the boom and bucket, the connection to the latter section preferably being at a position between boom and bucket control portions.

A balancing connection may also be made, for example, between the two track sections, and/or a connection in parallel with, for example, the bucket function.

The balancing connection may include a pressure compensated balancing valve.

DETAILED DESCRIPTION OF THE PREFERRED EMBODIMENTS

Figure 1:
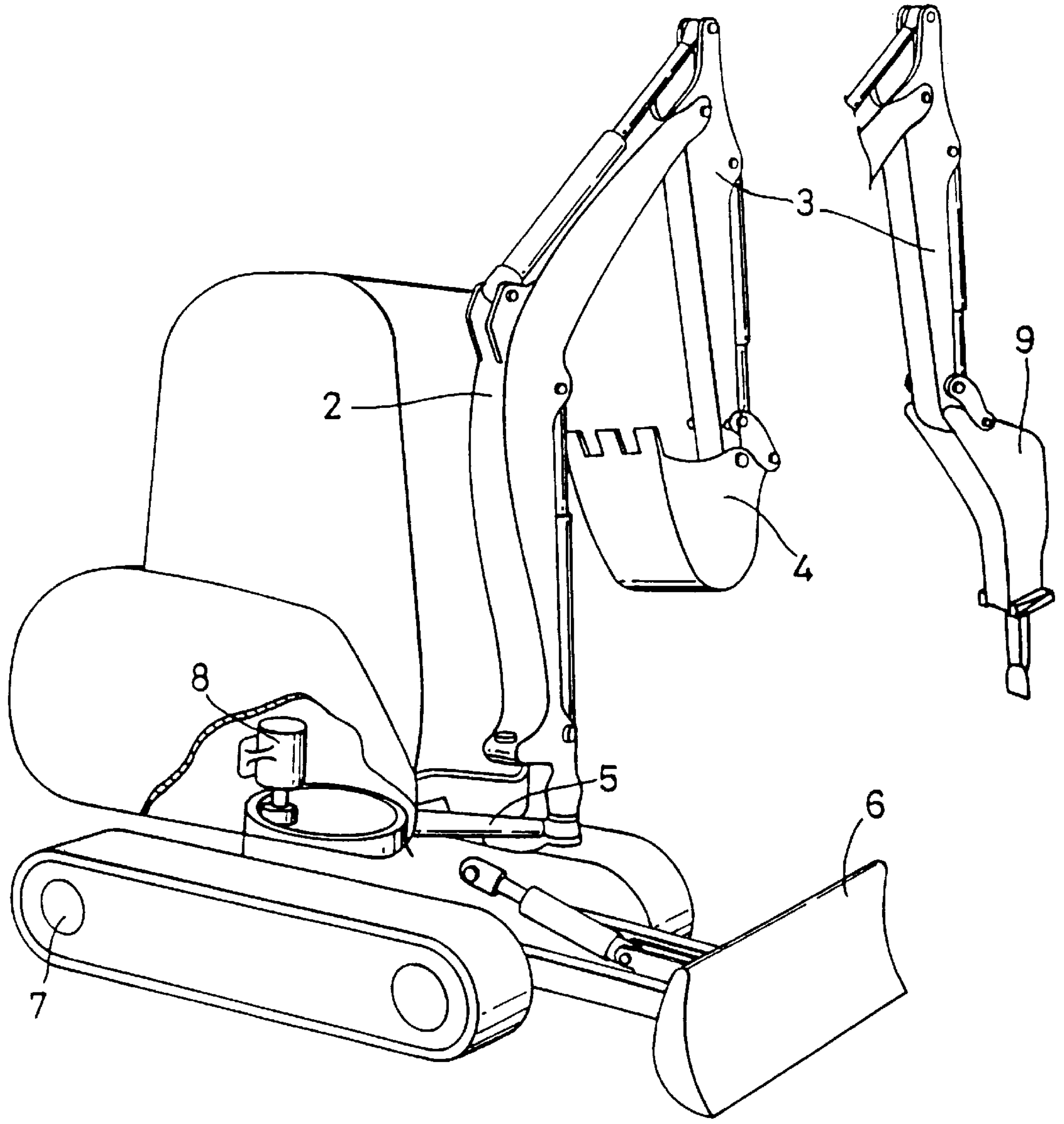
(PRIOR ART) Fig. 1
FIG. 1 is a diagrammatic view of a mini excavator.
Figure 2:
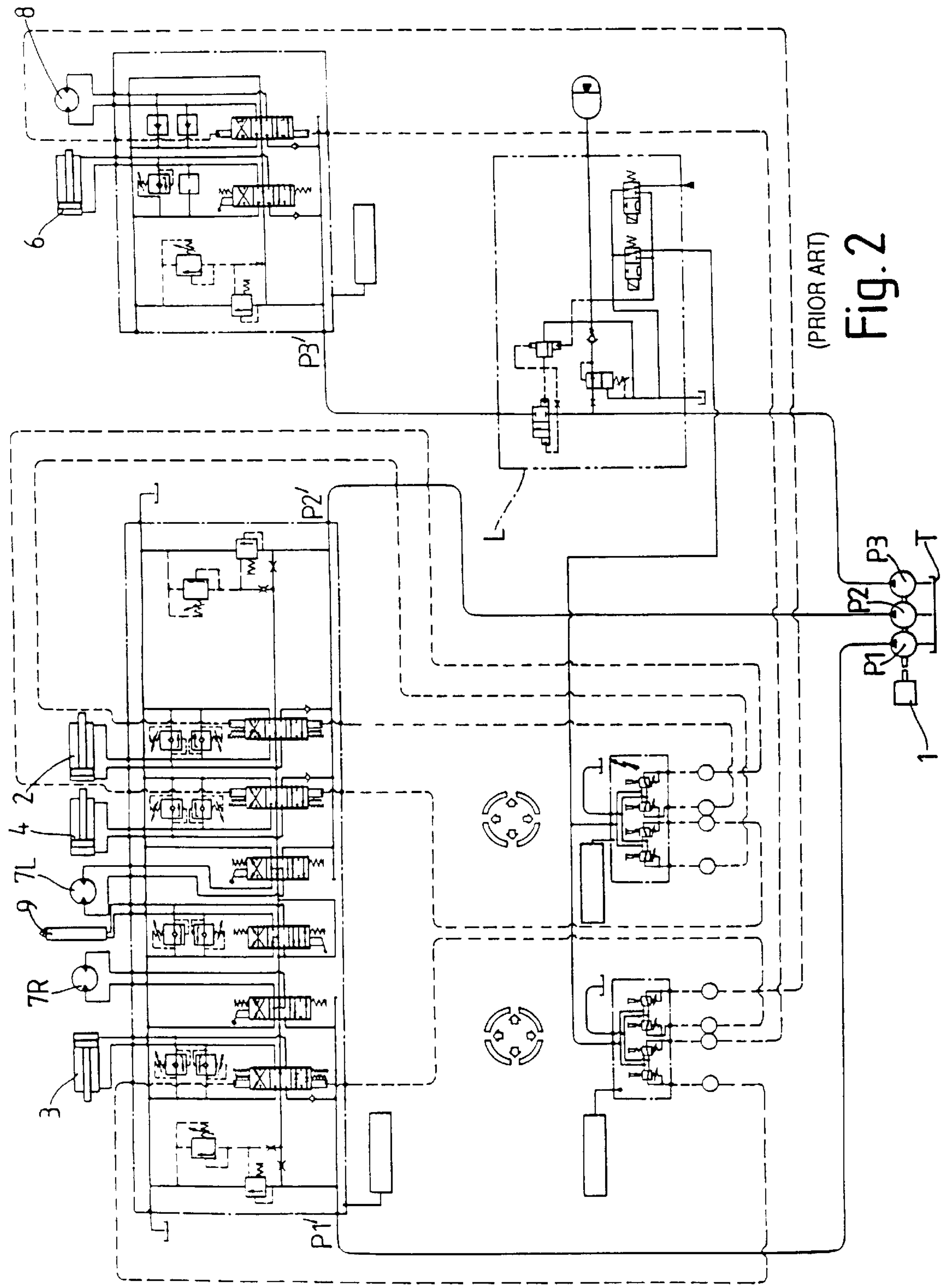
(PRIOR ART) Fig. 2
FIG. 2 is a typical hydraulic control circuit for the mini excavator of FIG. 1.

Mini excavator machines are generally constructed as shown in FIG. 1 and provided with a hydraulic control circuit as shown in FIG. 2. The hydraulic circuit comprises a set of three fixed displacement gear pumps P1,P2,P3 driven by a prime mover 1, and one or two hydraulic control valve blocks which together admit the pump flows at three distinct points on the circuit P1',P2',P3'.

Referring to FIG. 1, the valve blocks control the direction of the oil flow into linear hydraulic actuators (not shown) controlling a first arm 2 (boom), a second digging arm 3 (dipper), a bucket function 4 mounted and pivoted on the end of the dipper 3, a swing function 5 used to rotate the boom arm about a fixed vertical pivot mounted on the machine super structure and a dozer function 6 mounted at the front of the machine. The valve blocks also control several rotary actuators (not shown) which in turn control two track drive motors 7 and a further swing function 8 achieved with a motor rigidly connected to the machine superstructure rotating against a slew ring fixed to the undercarriage of the machine and arranged to rotate the superstructure of the machine relative to its undercarriage. An auxiliary service 9 is also provided to control a single acting function such as the hammer function shown, or a number of alternative options.

This standard circuit of FIG. 1 achieves a poor control of the machine functions, particularly, as already mentioned:

1. Lack of simultaneous operation of movements without interaction.

2. Low speed of operation.

3. Track flows not balanced.

The standard circuit layout of FIG. 2 has the first pump flow P1' connected to one end of a combined valve and in a neutral valve state. This flow passes through the dipper 3 and RH track 7R sections and flows to tank T at the hammer section 9. The second pump flow P2' is connected to the opposite end of the combined valve and this flow passes through the boom 2, bucket 4 and RH track 7R sections and then to tank T through the hammer section 9, The third pump flow P3' is connected to a second valve after passing through a pilot supply valve L and then passes through the blade 6 and swing 5 sections before returning to tank T.

There are several well known modifications which can be applied to the standard circuit of FIG. 1 to improve some of the above mentioned defects but they are not capable of providing simultaneous operation of say, five functions and at the same time increasing significantly the speed of the machine cycle. A circuit having these modified features is shown in FIG. 3.

One possible modification is to utilise a pump flow which is not pressurised and bypassed to tank in order to supplement the flows to another part of the circuit. FIG. 3 shows an embodiment of this principle where the hammer section 9 uses one port connection 9*a* only to operate the hammer function. The other port 9*b* is then connected externally through a check valve 11 to the boom cylinder (not shown). Using this arrangement, it is possible to direct flow from the pump P1 to the boom cylinder potentially doubling its flow rate. This is used to achieve a fast boom raise action on a machine.

Figure 3:
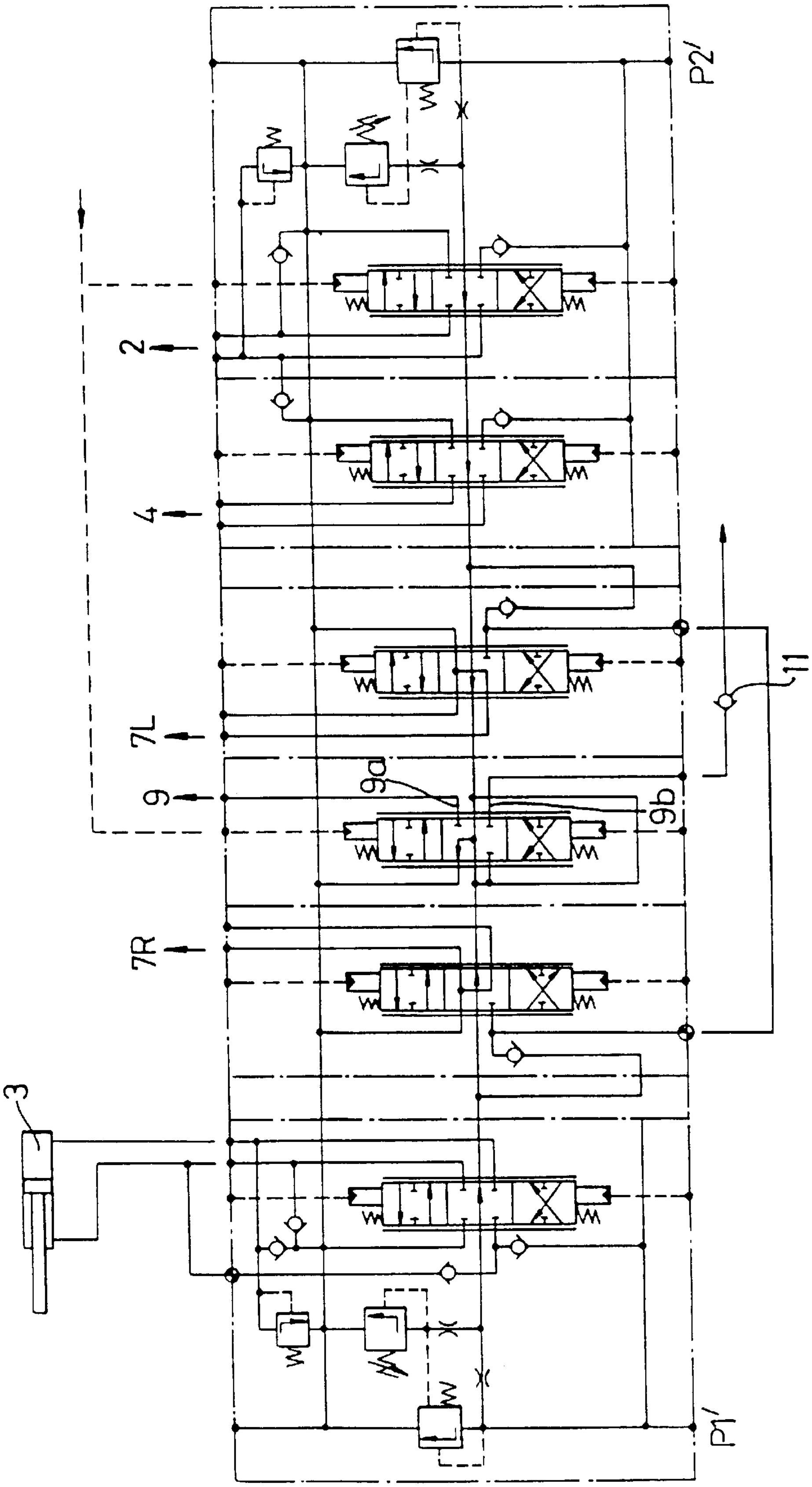
(PRIOR ART) Fig. 3
FIG. 3 is a known improved hydraulic control circuit for the mini excavator of FIG. 1.

The standard circuit is constructed having each function within each of the three valve banks, connected in parallel, e.g. boom and bucket functions 2,4 as shown in FIG. 3.

When two parallel functions are selected simultaneously to different load pressure conditions, the supply flow to each branch of the parallel circuit divides according to the resistance to flow in each section. Thus when load pressures vary as in a machine operating cycle, the flows change in response and the functions interact with each other.

One way to avoid this is to connect the two functions in tandem, e.g. dipper and LH track functions 3, 7L as shown in FIG. 3. Tandem circuits provide a priority of pump flow to the first section in the tandem group and thus prevents interaction between the functions in the group. Tandem circuits are normally employed when functions are required to be moved sequentially. The main disadvantage is that the circuit will not allow the two functions to be operated simultaneously, and, at all times, the first function takes priority over the following ones.

Some improvements to function interaction can be achieved using closed centre valves as a result of which it is possible to introduce individual function compensators to balance the distribution of flow between sections operating at different load pressure valve. However, closed centre valves used with either fixed or variable displacement pumps are more complex and expensive than equivalent open centre valves currently in use.

Each of the above improvements, taken individually and applied to a standard parallel circuit, can offer speed or control improvements to the function on which they are applied. However even if all improvements above were combined together they could not achieve simultaneous operation of up to say five functions without interaction and would not increase significantly the function speed to reduce the overall machine cycle time.

A hydraulic control valve system or circuit in accordance with the present invention achieves both direction, flow and pressure control of a number of actuators both linear differential area and rotary types configured to control the functions of a machine. Typical of this application is the mini-excavator of FIG. 1.

Figure 4:
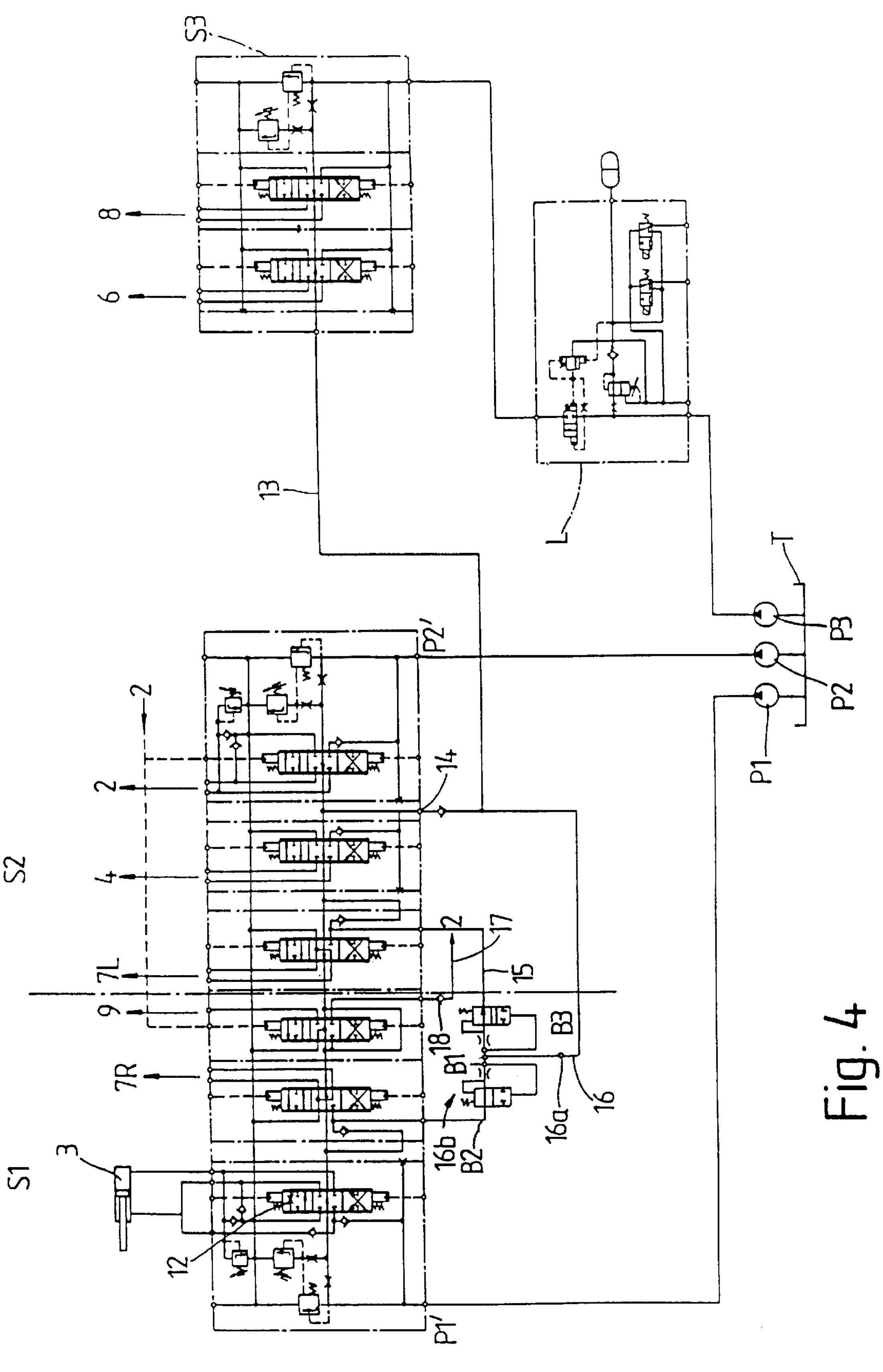
FIG. 4 is a hydraulic control circuit in accordance with the present invention for the mini excavator of FIG. 1.

A valve circuit in accordance with the invention is shown in FIG. 4 and is arranged in three independent sections, S1,S2,S3 each with an inlet followed by several implement controls, and an outlet means of passing the flow to tank T. Such a valve can be grouped together to combine inlets or outlets to achieve a more compact solution, yet remaining as three independent circuits.

A typical arrangement of the function controls on a mini-excavator are as shown in FIG. 4.

Valve section S1 controls or partially controls Dipper 3/ RH Track 7R/ and Auxiliary Function, e.g. hammer 9.

Valve section S2 controls or partially controls boom 2/ bucket 4/ LH track 7L and eg. hammer 9.

Valve section S3 controls or partially controls blade 8 and swing 6/ bucket 4/ LH track 7L/ RH track 7R.

This layout allows one function in each valve section to be connected to a dedicated pump and therefore eliminate service interaction. In each valve section the remaining sections are normally connected in parallel and interaction within the valve section is possible.

The valve sections are further modified as shown in FIG. 4 by the introduction of tandem circuits between:

Dipper 3, RH track 7R and hammer 9

Bucket 4, LH track 7L and hammer 9

Boom 2 and bucket 4

Tandem circuits provide a priority of pump flow to the first function in each valve section and in sections where three functions are connected in tandem the priority is a cascade. If the first function is not selected, then priority passes to the second spool and so on to the third spool.

The control circuit also includes some interconnection between valve sections to achieve a better distribution of circuit flow to match the application requirements. This is achieved without, however, disturbing the priority order established for each pump. One interconnection is a connection 13 from the outlet of valve section S3 to the valve section S2 at a position 14 between the boom and bucket sections 2,4.

A further improvement is the introduction of a balancing line 15 between the two track sections 7R,7L and a connection 16 in parallel with the bucket function 4 from the valve section S3.

Flow from valve section S3 is admitted to each line across a check valve 16*a*.

The balancing line 15 also includes a pressure compensated balancing valve 16*b* which ensures that flow entering the valve at B1 can be distributed evenly between ports B2 and B3.

The balancing valve 16*b* also permits the passage of flow from B2 to B3, and vice versa.

To increase the speed of a function taking advantage of the area ratio of its linear actuator to regenerate flow from its annulus end to piston end, a regenerative circuit is further improved in accordance with the invention by the introduction of a bleed orifice 12 from the rod end to tank. This orifice 12 allows a stalled or near-stalled actuator to develop its full load potential by applying its full pressure drop over the cylinder piston area rather than only the rod area during the full speed regenerative action. FIG. 4 shows this feature applied to the dipper function 3 and the regenerating flow allows a dramatic increase in the actuator speed in its extending direction. A further benefit of the regenerative function feature is its ability to eliminate cavitation on the piston side when the actuator is moved under a gravitational load.

The circuit also includes a summation flow line 17 from the auxiliary function 9 to the boom raise line across a check valve 18 as also shown in FIG. 4. This is included in the circuit to obtain the benefits as described earlier.

The priority order for each pump flow in the circuit is as follows:

| Priority Pump1(P1) | Pump 2(P2) | Pump 3(P3) |
|---|---|---|
| 1. Dipper 3 | Boom 2 | Blade 8/Swing 6 |
| 2. LH Track 7L/RH Track 7R | Bucket 4 | Bucket 4/LH & RH Track 7L, 7R |
| 3. Aux 9/Boom boost | RH Track 7R/ LH Track | Aux 9/Boom boost |
| 4. | Aux 9/Boom boost | |

During a typical machine excavation cycle the following combination of functions are required, the figures in brackets showing the principal pump supplying flow to each section:

1. Excavating at bottom of trench: Dipper (P1), Boom (P2) and Bucket (P3). The tandem circuit places flow from pump P2 in a priority to the boom function and bucket is supplied from the carryover line from pump P3 plus any excess flow from the boom function. The dipper function is supplied from pump P1 and the three functions can all operate independently of each other.

2. Lifting from the trench: Boom (P2), dipper (P1) and swing (P3). When the boom is raised, the external summation circuit from the hammer section directs the flow from pump P1 and the flow from pump P3 to the boom cylinder, with bucket 4 in neutral and not consuming flow from pump P3. The main boom flow from pump P2 is added to give a very high flow to this function and achieve a very high speed. When the bucket is clear of the trench, the combination of swing and dipper are gradually introduced. Swing will take priority over flow from pump P3 and dipper from pump P1, and the overall speed of boom raise reduces correspondingly. With the exception of the reduction in boom speed, the three functions remain independent of each other.

3. Expelling spoil: Bucket (P2), dipper (P1) and swing (P3). When the boom has reached maximum height, the bucket function has flow available from pumps P2 and P3 and can achieve a high speed of bucket openings. The flow from pump P1 is available throughout this phase to operate dipper. When all three services are fully selected together, they remain independent of each other.

4. Returning to trench: Swing (P3), boom (P2) and dipper (P1). During this operation, it is required to operate dipper, swing, boom and bucket all together and if functions are only partially selected, this is possible with the tandem circuit. Bucket must rely on surplus flow from swing or boom functions.

The two tracks 7L,7R are interconnected and this allows both tracks to be supplied from the same pump.

For example if dipper is fully selected, flow from pump P1 is prevented from reaching the RH track function 7R. However, the balance line 15 allows the flow from pump P2 to be shared between the two tracks.

In this way it is now possible to supply tracks in parallel with other services selected. With dipper selected, tracks are supplied by pump P2. With boom and dipper selected, tracks are supplied by pump P3. With bucket and dipper selected, spill off flow from bucket (pumps P2 and P3) can be supplied to tracks.

Without this feature a combined selection of tracks and dipper would result in the right-hand track sharing its flow with dipper whilst the LH track received full pump flow. This gives rise to a flow imbalance and the machine steers off course in a manner which is not predictable, but is a function of the load pressures in each of the sections.

If any of the priority 1 functions are only partially selected, then the excess flow not used by that function can spill across to the next priority function.

Thus it is possible to operate dipper, boom, bucket and swing all together albeit with one pump flow shared between swing and bucket or with bucket supplied with spill off flow from both boom and swing. This same principle allows the operation of all four digging services at partial flow along with both tracks. This gives the machine better mobility particularly when the digging arm is used to increase tractive effort to move the vehicle whilst climbing, dozing or recovery from slippery ground conditions. Thus simultaneous movement of more than three functions is possible.

The present invention provides a circuit which greatly enhances the performance of the functions by an efficient distribution of flow. The major benefits are increased function speed, simultaneous operation without load interaction for three functions, and under partially selected conditions the possibility to control more functions simultaneously. The latter performance could only be achieved using either a more complex and expensive closed centre valve solution, or an open centre valve with a highly skilled operator.

This system achieves a high degree of performance at relatively low cost and requires only basic operator skills to achieve good performance.

We claim:

1. A fluid power control apparatus comprising:

a first control section including first and second control valves connectable in tandem, and first and second sources of working fluid under pressure, the first source being operatively connectable to a higher priority control valve of the first and second valves and the second source being operatively connectable to an interconnection between the valves, in such a way that on switching of the first valve from a neutral position the relationship between the said valves progressively alters from a tandem relationship to one in which the said valves are supplied separately by the respective sources and wherein the first control section includes a third control valve operatively connectable in tandem with the second control valve, the second source being operatively connectable to the interconnection between the second and third control valves.

2. An apparatus according to claim 1 including a second control section having fourth and fifth control valves connectable in tandem and a third source of working fluid under pressure, the third source being operatively connectable to the higher priority valve of the fourth and fifth interconnection between the fourth and fifth valves, whereby on switching of the fourth valve from a neutral position the relationship between the higher priority and fifth valves progressively alters from a tandem relationship to one in which the fourth and fifth valves are supplied separately by the third and second sources respectively, wherein the fourth control valve is connected to a double acting actuator in a regenerative circuit, wherein a reduced-area side of the actuator piston is connectable to tank during the movement of the actuator in one direction, to permit application of the pressure in the fourth control valve over substantially the working entire surface area of one side of the actuator piston during movement of the actuator in the said direction, wherein the fourth control valve includes a bleed orifice for selectively connecting the reduced-area side of the said piston to tank.

3. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively.

4. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively and further including a sixth control valve connectable in tandem with the fifth control valve and/or in tandem with the third control valve.

5. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively and further including a sixth control valve connectable in tandem with the fifth control valve and/or in tandem with the third control valve, wherein one port of the sixth control valve is operatively connectable to a single acting actuator, and a further port thereof is operatively connectable to provide a boost fluid supply to a further actuator supplied by one or more or the other control valves.

6. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively, including a further interconnection, between the third and fifth control valves, the second source being operatively connectable to the said interconnection to supply working fluid to said third and fifth control valves.

7. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively, including a further interconnection, between the third and fifth control valves, the second source being operatively connectable to the said interconnection to supply working fluid to said third and fifth control valves, wherein the interconnection between the second source and the third and fifth control valves is pressure compensated, to bias flow towards that of the third and fifth valves operating at lower pressure than the other.

8. An apparatus according to claim 1 including a third control section, including at least one control valve, operatively connected in said first and third control sections.

9. An apparatus according to claim 1 including a third control section, including at least one control valve, operatively connected between the second source and the first source, wherein the third control section includes two control valves operatively connected in parallel.

10. An apparatus according to claim 1 including a second control section having fourth and fifth control valves connectable in tandem and a third source of working fluid under pressure, the third source being operatively connectable to the higher priority valve of the fourth and fifth control valves, and the second source being operatively connectable to the interconnection between the fourth and fifth valves, such that on switching of the higher priority valve from a neutral position the relationship between the fourth and fifth valves progressively alters from a tandem relationship to one in which the fourth and fifth valves are supplied separately by the third and second sources respectively, wherein the fourth control valve is connected to a double acting actuator in a regenerative circuit, wherein a reduced-area side of the actuator piston is connectable to tank during the movement of the actuator in one direction, to permit application of the pressure in the fourth control valve over substantially the working entire surface area of one side of the actuator piston during movement of the actuator in the said direction.

11. An apparatus according to claim 1 including a pressure tapping coupled to the second source to provide hydraulic pilot control for the control valves.

12. A vehicle including an apparatus according to any of claims 1 and 3 to 11.

13. A vehicle according to claim 12 configured as a mini-excavator.

14. A method of controlling a plurality of double acting actuators comprising:

(i) supplying wording fluid under pressure from a first source to a first control section of a fluid power control circuit, the first control section including first and second control valves operatively connectable respectively to first and second actuators and in a tandem relationship with one another so that the first control valve tends to have priority of supply from the first source; and (ii) supplying working fluid under pressure from a second source to an interconnection between the first and second control valves in such a way that, on switching of the first valve from a neutral position, the relationship between the said vales progressively alters from a tandem relationship to one in which the said valves are supplied separately by the respective sources; and (iii) supplying working fluid under pressure from the second source to an interconnection between the second control valve and a third control valve operatively connected in tandem therewith.

15. A method according to claim 14, including the steps of:

(iv) supplying working fluid under pressure from a third source to a second control section of a fluid power circuit, the second control section including fourth and fifth control valves operatively connectable to fourth and fifth actuators respectively and in a tandem relationship with one another so that the fourth control valve tends to have priority of supply from the third source; and (v) supplying working fluid under pressure from the second source to the interconnection between the fourth and fifth control valves, such that on switching of the first valve from a neutral position the relationship between the fourth and fifth valves progressively alters from a tandem relationship to one in which the fourth and fifth valves are supplied separately by the third and second sources respectively.

16. A method according to claim 14 including the step of:

(vi) supplying working fluid under pressure from the second source to an interconnection between a fourth control valve and a fifth control valve operatively connected in tandem therewith.

17. A method according to claim 14 including the step of:

(vi) supplying working fluid under pressure from the second source to an interconnection between a fourth control valve and a fifth control valve operatively connected in tandem therewith including the steps of:

(vii) supplying working fluid under pressure from one port of the sixth control valve to a single acting actuator; and (viii) supplying working fluid under pressure from another port of the sixth control valve as boost fluid to a further actuator supplied by one or more of the other control valves.

* * * * *